US012384017B2

(12) United States Patent
Nelson

(10) Patent No.: US 12,384,017 B2
(45) Date of Patent: Aug. 12, 2025

(54) ROBOT FOR PIPE NAVIGATION

(71) Applicant: NUtech Ventures, Lincoln, NE (US)

(72) Inventor: Carl Nelson, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 795 days.

(21) Appl. No.: 17/474,995

(22) Filed: Sep. 14, 2021

(65) Prior Publication Data

US 2022/0080579 A1   Mar. 17, 2022

Related U.S. Application Data

(60) Provisional application No. 63/077,774, filed on Sep. 14, 2020.

(51) Int. Cl.
*B25J 9/00* (2006.01)
*B25J 5/00* (2006.01)

(52) U.S. Cl.
CPC ............ *B25J 9/0009* (2013.01); *B25J 5/007* (2013.01); *B25J 9/009* (2013.01); *B25J 9/0084* (2013.01)

(58) Field of Classification Search
CPC . B25J 5/007; B25J 9/0009; B25J 9/009; B25J 9/0084; B25J 11/00; F16L 55/28
USPC .................................. 280/5.2, 5.26, 400
See application file for complete search history.

(56) References Cited

FOREIGN PATENT DOCUMENTS

JP           H076026 U  *  1/1995
WO   WO-2021038301 A1  *  3/2021  .......... B62D 57/028

* cited by examiner

*Primary Examiner* — Valentin Neacsu
*Assistant Examiner* — Felicia L. Brittman-Alabi
(74) *Attorney, Agent, or Firm* — Leydig, Voit & Mayer, Ltd.

(57) ABSTRACT

A pipe inspection robot includes first and second bodies connected by a connection mechanism, at least two legs connected to the first body, and at least two additional legs connected to the second body, each of the at least two legs and the at least two additional legs including a linkage connected at one end to the first or second body, and a pipe engaging member connected at another end of the linkage; wherein each linkage is configured to operate between a stowed position, in which the pipe engaging member is disposed adjacent the first or second body, and an extended position, in which the linkage is adapted to cause the pipe engaging member to slide against an inner surface of a pipe.

17 Claims, 5 Drawing Sheets

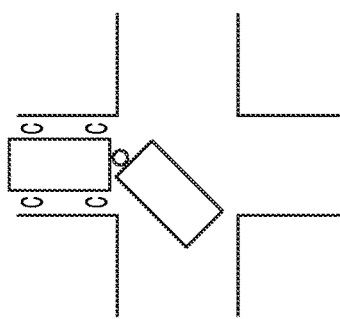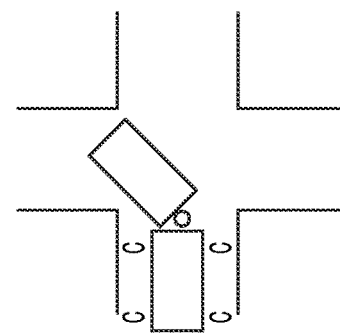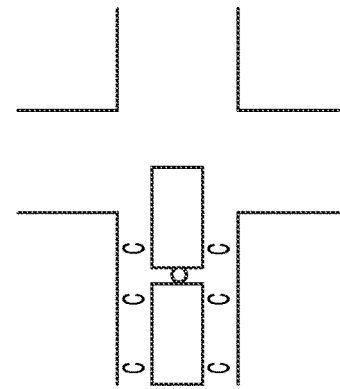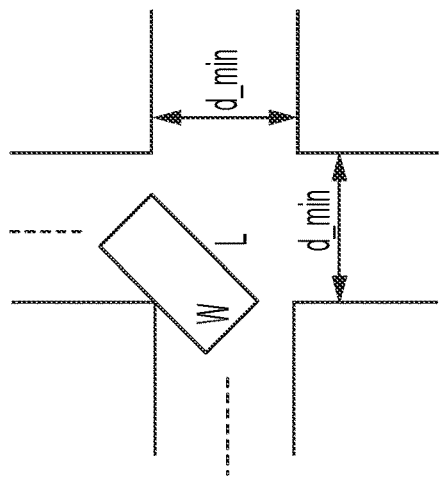

ROBOT FOR PIPE NAVIGATION

CROSS-REFERENCE TO RELATED APPLICATIONS

This patent application claims priority to U.S. Provisional Patent Application Ser. No. 63/077,774, filed on Sep. 14, 2020, which is incorporated herein in its entirety by this reference.

BACKGROUND OF THE DISCLOSURE

Robots for inspecting pipelines and similar structures are useful in diagnosing and preventing issues that may arise in the maintenance and operation of such systems. As can be appreciated, above-ground piping can possibly be inspected externally, but below-ground piping, or piping extending through inaccessible areas sometimes requires an internal inspection. Internal piping inspections, as can be appreciated, require entry into the pipe with visual means to detect deterioration areas or damaged areas.

Solutions have been proposed in the past for automatic devices, commonly referred to as robots, that are configured to pass through a pipe to perform an inspection. In some instances, these robots are small, battery-operated or connected to an umbilical cord for power, and include video cameras and/or other sensors to perform the inspection. However, as is often the case, these robots must navigate narrow turns and junctions, which makes their operation difficult.

BRIEF SUMMARY OF THE DISCLOSURE

Robots for pipe inspection have become more prevalent in recent years, and expanding the capabilities of these robots is of interest. Specific needs include accommodating a larger range of pipe sizes without needing customized robots, and navigating sharp bends in pipe networks. The present disclosure describes a new pipe robot architecture with emphasis on a novel multi-link wheel-leg design. Favorable properties of the kinematics and kinetostatics of the robot are illustrated through analysis and simulation, and bounds for feasible component dimensions based on task descriptions are presented.

In one aspect, the present disclosure describes a method and system for pipe inspection. A pipe inspection robot includes first and second bodies connected by a connection mechanism, at least two legs connected to the first body, and at least two additional legs connected to the second body, each of the at least two legs and the at least two additional legs including a linkage connected at one end to the first or second body, and a pipe engaging member connected at another end of the linkage; wherein each linkage is configured to operate between a stowed position, in which the pipe engaging member is disposed adjacent to the first or second body, and an extended position, in which the linkage is adapted to cause the pipe engaging member to contact the inner surface of the pipe.

BRIEF DESCRIPTION OF THE SEVERAL VIEWS OF THE DRAWING(S)

FIGS. 9a-9d and FIG. 10 are schematics of design considerations in accordance with the disclosure.

DETAILED DESCRIPTION OF THE INVENTION

Inspection of pipeline networks represents a vast industry throughout the world. To provide a sense of scope, there are more than 3.8 million km of pipelines that are estimated to exist in the Unites States energy network alone, and these require regular inspection and maintenance. In addition to external inspection, a common method of internal pipe inspection is to navigate a "pig" or traveling inspection device between ports in the pipeline designed for this purpose. Unfortunately, a large percentage of pipe sections are not suitable for this technique, either due to bends in the pipeline or other factors such as the presence of sensors and other structures that may be connected internally to the pipeline.

Robotic approaches to pipe inspection have become more and more prevalent over the past two decades to fill these needs. Many pipeline robot designs have been proposed, varying in size, locomotion strategy, and capabilities. For example, one research group chose an inchworm-type locomotion with a passive spring in between modules to both conform to bends and allow variation of the inter-segmental distance. Another inchworm-type robot was proposed recently with tensegrity units in between segments to provide active steering.

Many robot designers, however, have preferred wheeled or tracked locomotion. At the most basic level, a pipeline robot can just be a simple wheeled rover, but this can limit robot capabilities in terms of climbing inclines and controlling tractive force. Therefore, many robots include a means of adjusting the effective diameter of the robot and/or the force applied to the pipe wall at the wheel or track.

From the point of view of kinematics, there are several "leg" mechanisms which have been extensively used to achieve this size/force adaptation, including scissor mechanisms, the parallelogram (four-bar linkage), and the slider-crank linkage. Other approaches, such as simple pivoted legs, prismatically extending legs, and four-bar mechanisms, have also been used. Many of these robots use springs to passively adjust shape and maintain contact with the pipe wall.

Conspicuously absent, however, from the previously proposed mechanisms is a leg design, which can accommodate large variations in pipe diameter. Steering is also a feature that is often under-addressed in these robots, due to either passive pipe-following approaches or inadequate range of steering motion.

The present disclosure presents a novel robot design for navigating inside pipes with a large range of sizes. The characteristics of the design also lend themselves to passively maintaining good contact distribution at the wheels and navigating difficult bends. The design approach and modeling are laid out in the sections that follow.

Figure 1:
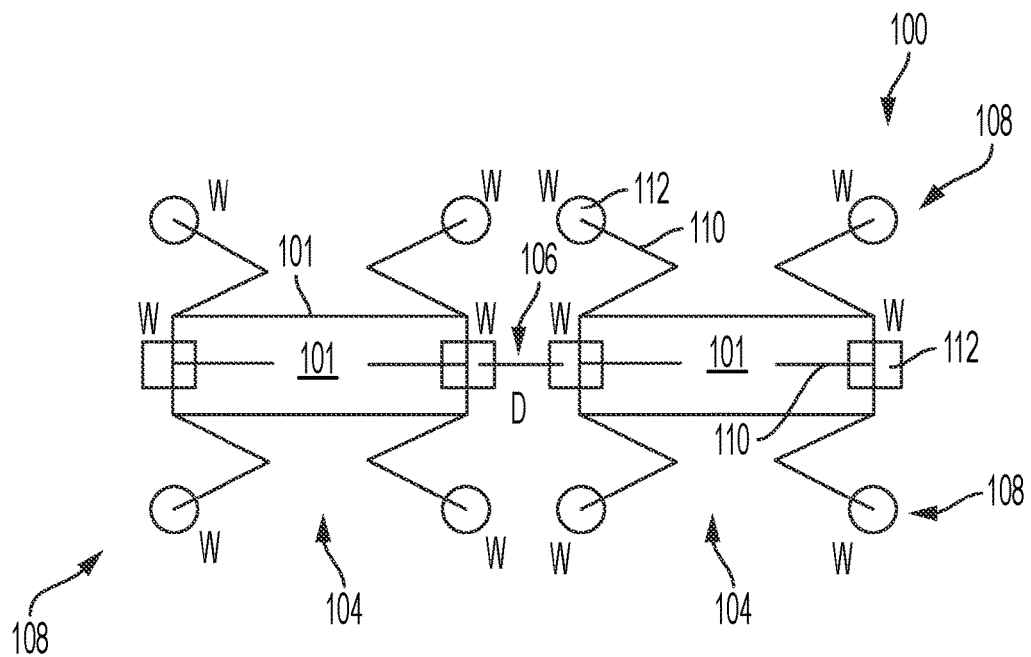
FIG. 1 is a schematic view of a robot from a side perspective in accordance with the disclosure.
Figures 2, 3:
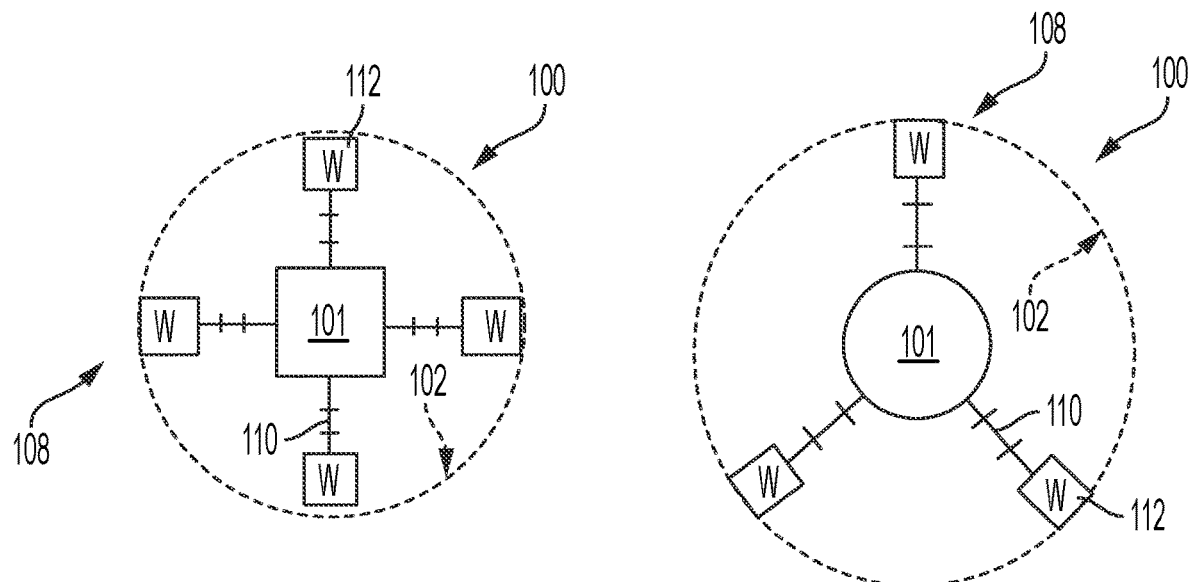
FIGS. 2 and 3 are schematic views of two embodiments for a robot from a front perspective in accordance with the disclosure.

The overall design for a robot 100 in accordance with the disclosure is shown schematically in FIGS. 1, 2 and 3 from various perspectives. It is noted that systems and structures typically used to construct robots such as batteries or other power storage devices or systems, one or more controllers, wireless and/or wired communication systems, visual and audio devices, lights, and the like can be included in the robot 100 but are omitted in these illustrations for simplicity. In reference to these figures, the robot 100 is advantageously configured to passively adjust to small changes in pipe profile, actively adjust to large changes in pipe profile, accommodate profile diameter changes greater than the robot module length, accommodate both gradual and sharp (90°) bends, and the like, by using articulating linkages having self-propelled wheels contacting an inner surface of the pipe 102.

More specifically, for example, in a larger pipe section, a relatively small robot would have difficulty navigating a sharp bend (or "intersection") due to discontinuities of wheel contact, and in a narrower pipe section the difficulty might come from impingement of the robot body against the corner of the pipe at such an intersection.

To resolve these issues, the chosen architecture uses two identical modules 104 connected to one another by a connection mechanism 106. Rather than using an inchworm approach, each module 104 has a body 101 onto which two sets of four independently driven legs 108 are pivotally connected. Each leg 108 includes a linkage 110 and a pipe engaging member, which in this embodiment is embodied as a wheel 112. In the illustrated embodiment, the wheels 112 are shown as cylindrical rolling elements of the type that is typically rotatably associated with an axle to provide a rolling motion, but it should be appreciated any another motion mechanism or device that rotatably, or at least slidably, engages a surface can be used as a pipe engaging member. For example, pipe engaging members can be embodied as tracks, crawling tracks or legs, sleds, and the like can also be used as motion mechanisms attached at the end of the legs to engage the inner surface of the pipe and permit motion of the robot along the interior of the pipe. Combinations of different pipe engaging members can also be used. For example, wheels, tracks or other rolling mechanisms may be used to propel the robot along the inner surface of the pipe on some legs, while other legs can include sliding members such as sleds to guide and locate the robot within the pipe.

The connection mechanism 106, which is embodied as a differential joint, connects the two modules 104 for steering, as shown in FIG. 1. In this way, each of the two modules 104 possesses 9 degrees of freedom (DOF), which include 8 wheel drives, and one axis of relative motion between modules, not counting the articulation of the wheel-legs. In the embodiment of FIG. 2, it can be seen that the wheels 112 contact the pipe 102 at diametrically opposite portions thereof, but it should be appreciated that as few as two wheels, three wheels, as shown in FIG. 3, or more than three wheels with associated linkages can be used to support either end of either of the two modules 104, and also additional sections along each module depending on the size of the robot and also the type of bends and other features present within the pipe. For example, traversing a small diameter pipe section such as traversing a valve may require three sets of wheels disposed along the body of the robot module such that two sets of wheels contact the pipe at all times to stabilize the robot while the third set of wheels contracts to pass through a reduced diameter section.

It should be noted that the drive DOFs could be reduced to as few as 1 per module, but this may increase mechanism complexity (since wheel-legs independently passively adjust to facilitate wall contact) and would require slip at the wheels to navigate certain bends, so this is a design choice or tradeoff (i.e., all-wheel-drive considered superior to skid-steering). Each wheel 112 in the illustrated embodiment includes a motor integrated therewith to provide powered wheel rotation that is independently and selectively controllable independently and in concert with the remaining wheels to provide desired motion characteristics such as emulating a mechanical differential when the robot is turning, helical motion of the robot within the pipe, skid steering, and the like.

Because of the mechanisms chosen to adjust to different pipe sizes, previous pipe robots generally are not able to accommodate pipe diameters significantly greater than one robot length. In a typical configuration, a pair of robot legs is approximately half as long as the robot, and the legs are stowed against the robot body for narrow pipe and deploy outward for large pipe diameters. In the instant configuration in accordance with the disclosure, a modular multi-link leg is such that larger diameters can be accommodated by adding leg segments. To simplify the leg design, the parallelogram, scissor, or slider-crank linkages of the prior proposed designs is replaced with cable-pulley constraints, such that "even" leg segments and "odd" leg segments remain respectively parallel to each other, which provides for a lighter and more compact leg.

Figure 4:
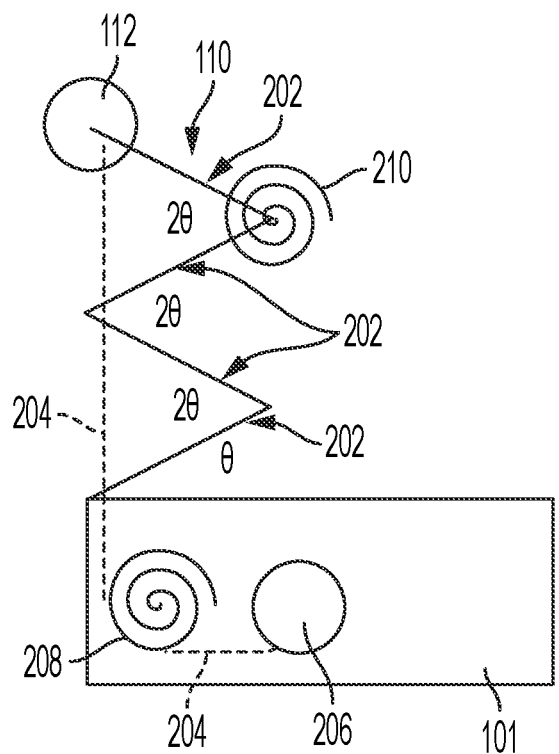
FIG. 4 is a schematic view of a tensioning and deployment mechanism for a linkage in accordance with the disclosure.
Figure 5:
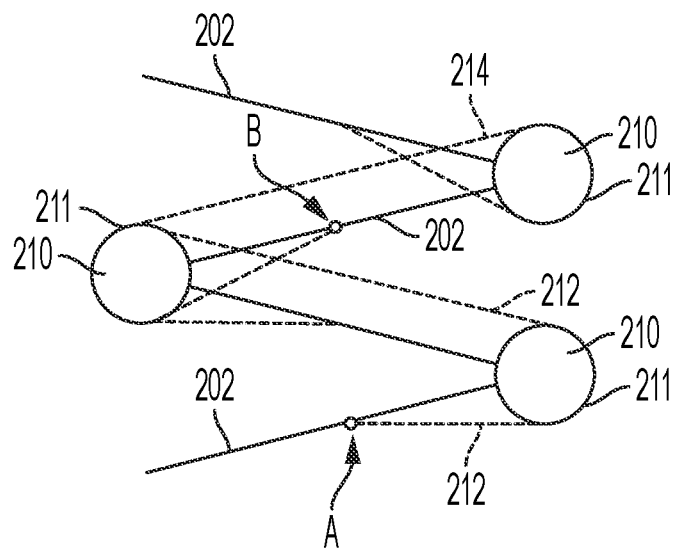
FIG. 5 is a schematic view of a linkage in accordance with the disclosure.

As shown in FIGS. 4 and 5, each leg segment 108 includes a single wheel 112 that is disposed at a distal end of a linkage 202. In alternative embodiments, more than one wheel or motion mechanism can also be used at the end of each leg segment. A plurality of linkages 202 are pivotally connected to one another at their ends such that the last linkage includes the wheel 112 at its distal end and the first linkage is pivotally connected to the body 101. A cable 204 connects the end of the leg 108 with a powered winch 206, and a spring 208 provides a biasing force that opposes the winch to provide tension to the cable. One or more springs 210 bias the linkages 202 in an extending direction such that the cable 204 remains taut to provide stability and dampening to the leg 108. Retraction of the cable 204 by the winch 206 retracts the leg 108 by folding the linkages relative to one another, and release of cable by the winch 206 permits the leg to extend resiliently under the biasing force provided by the springs 210 (only one shown).

Figure 6:
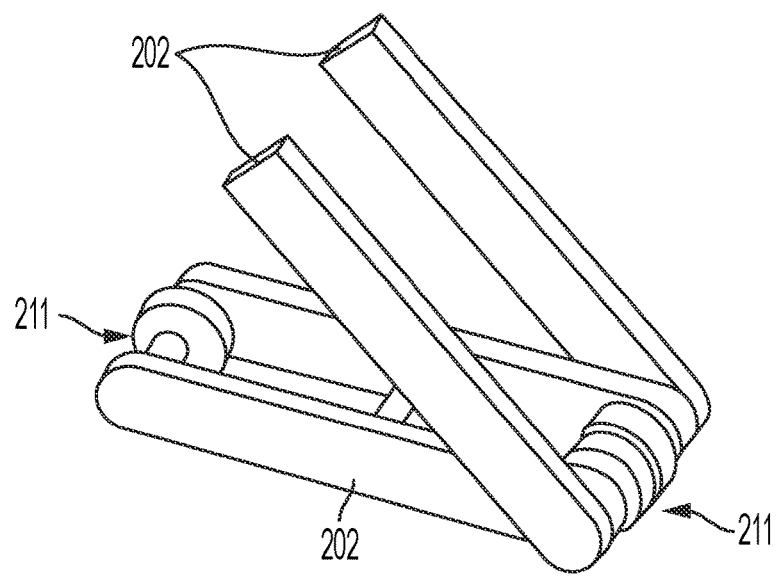
FIG. 6 is an exemplary embodiment for a portion of a linkage in accordance with the disclosure.

In the illustration of FIG. 5, and FIG. 6, it can be seen that the linkage segments 202 are connected to one another by pivot joints 211, each containing a spring 210. For the linkages to move in unison, cables 212 and 214 are connected around the joints 211 and connect adjacent linkages 202. Specifically, each cable 212 or 214 wraps over two joints or pulleys from an anchor point A on the preceding link 202 to an anchor point B on the following link (this is kinematically equivalent to a parallelogram linkage) after wrapping around two pivot joints 211.

Since the relative angular displacement of the leg segment pairs is double that of the first leg segment with respect to the robot body (FIG. 2 left), a single half-size pulley is needed; otherwise all pulleys are the same diameter. In this embodiment, a single torsion spring 210 can be used at the distal leg segment, without intermediate springs, to bias the leg to extend, and accommodates small changes in pipe profile, while the winch 206 with a series spring 204 is used to retract the leg to accommodate large changes in pipe diameter and/or regulate the effective stiffness of the leg-pipe interaction. Drive wheels and motors are located at the distal point of each leg.

Whereas the preceding sections outline the robot architecture and general design, the details related to parameter selection (values of length L, width w, and number of leg segments n) can be determined based on a particular application and pipe size. These parameters are tied to the particular requirements of the robot, especially the desired range of pipe sizes $[d_{min}\ d_{max}]$.

To illustrate the relationships that can be generally applied in adapting this robot design for specific task requirements, reference is made to FIGS. 9*a-d* and also FIG. 10. To achieve a 90° bend, the length of the differential between modules should be at least the minimum module width, to prevent self-collision of the two modules when bent at 90°. In this analysis, we adopt a conservative assumption for navigating 90° bends. This assumption is that as a robot module turns a corner, end-points travel on straight lines parallel to the center line of the pipe section, in a manner similar to a Scotch-yoke mechanism. Since the "coupler" link of a Scotch-yoke mechanism is closest to impinging at the intersection of the two perpendicular tracks when at 45° (see FIG. 9*b*), we can model the collision-free condition at the smallest pipe diameter as follows.)

$$(L/2+w)(\sin 45°) < d_{min}$$

To complete a turn and allow the forward module to gain traction and pull the rear module through (see FIG. 9*d*), it is necessary that:

$$L > w$$

In order for the robot to fit inside the smallest desired pipe diameter, we have:

$$w < d_{min}$$

where the width is constrained by w>2 nt, t is the thickness of each leg segment (viewed from the side) and n is the number of leg segments per leg; this involves a simplified assumption that the leg segments can collapse to lie flat against each other. Since each leg segment has length at most l=L/2, in order for the legs to reach the pipe wall and establish frictional contact, the number of leg segments is $$n > d_{max}/L$$

Figure 7A:
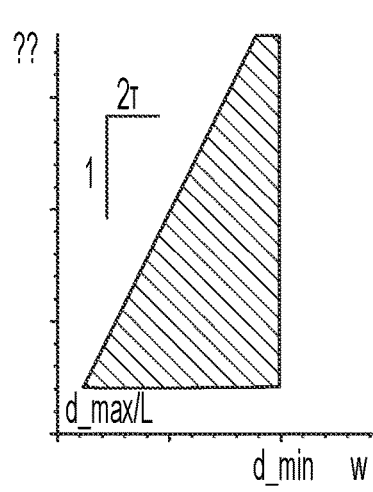
FIGS. 7a-7c are graphical representations of design constraints in accordance with the disclosure.
Figure 7B:
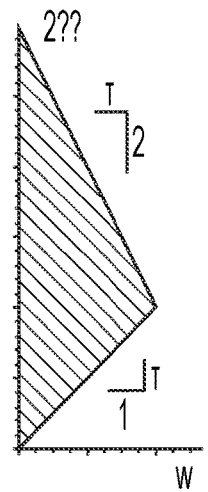
Figure 7C:
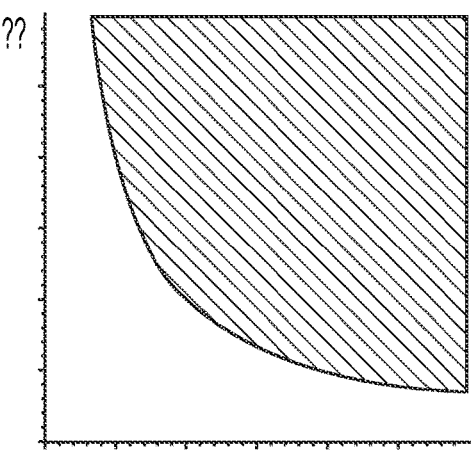

Collectively, these design constraints form a feasible design space in three dimensions (n, w, and L), and each constraint equation partitions the design space, as shown in FIGS. 7*a*-7*c*.

Figure 8:
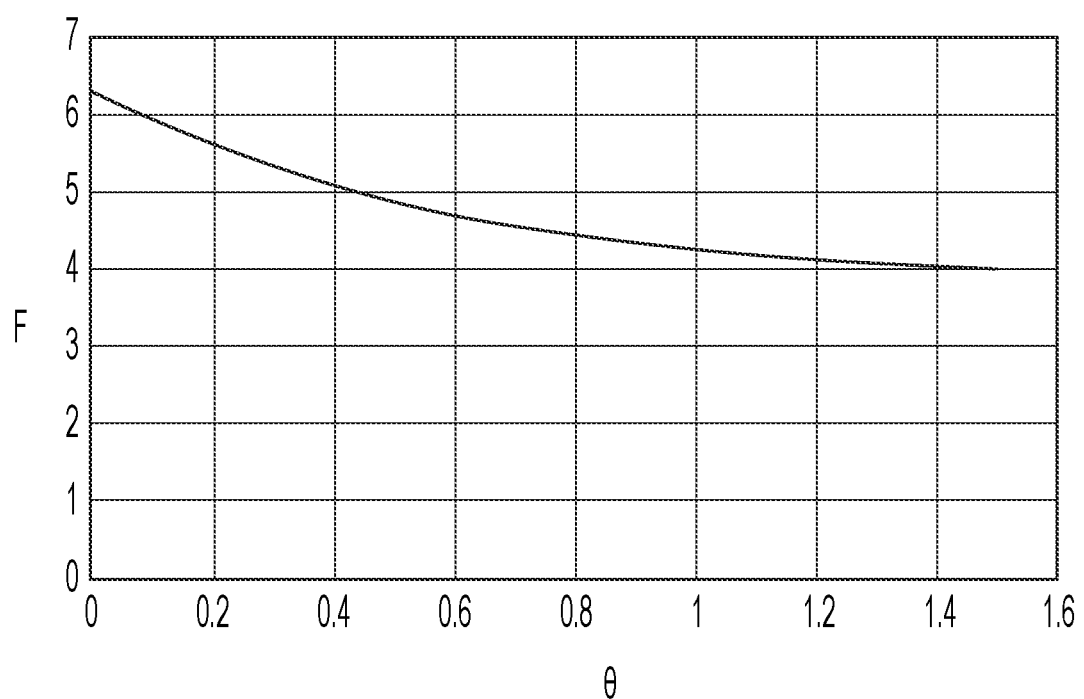
FIG. 8 is a force diagram in accordance with the disclosure.

We can also model the normal force F that can be generated at the wheel-wall interface with respect to the angle theta ($\theta$) as shown in FIG. 8. The kinematic relationship between the leg extension h and the angle of a single leg segment $\theta$ with respect to the axis of the robot body is $$h = nl \sin \theta$$

where l is the leg segment length, assumed here to be L/2. We assume a linear torsion spring as shown at the distal leg joint, which reaches its free state when the leg is fully extended (leg segments align) and is displaced to an angle $\varphi$ as the leg is folded. Applying the principle of virtual work with external force F at the pipe wall interface and torque T at the spring-loaded joint, $$dh = nl \cos \theta d\theta$$

and $$Fdh - Td\varphi = 0$$

With the effective angular displacement of the torsion spring expressed as $\varphi = \pi - 2\theta$ and based on the kinematic constraints shown earlier, the torque is $$T = k\varphi = k(\pi - 2\theta)$$

with k being the spring constant, which gives $$F = 2k(\pi - 2\theta)/(nl \cos \theta)$$

This function has an interesting asymptotic behavior, as shown in FIG. 8, which represents a compromise between the "relaxing" spring and the "stiffening" kinematics as the leg extends and approaches kinematic singularity. The force (or apparent stiffness) can also be reduced from this maximum value by tensioning the leg retraction winch if desired.

In one embodiment, the wheel-leg can extend to nearly double the overall module length, and adding leg segments could further extend this reach. With $d_{min}$ only slightly greater than w, this design satisfies the constraints outlined earlier in this section.

Reviewing the design requirements against the analysis and simulations given in the previous sections, it can be noted that the robot passively adjusts to small changes in pipe profile via the torsion spring in the wheel-leg; the robot actively adjusts to large changes in pipe profile by actuation of the leg retraction winch; the accommodates large profile diameter changes through its multi-segment wheel-leg design which can extend up to several times the pipe size depending on the number of leg segments used; and the robot accommodates gradual bends through the passive compliance of the wheel, for example, when traversing sharp bends through active adaptation of wheel-leg extensions.

The feasible design space is characterized through intersections of kinematic and geometric constraint inequalities, which can facilitate design for specific ranges of pipe diameter. It was also determined that this wheel-leg design possesses favorable properties in terms of force generation at the pipe wall interface. These attributes can be combined with wheel motion dynamics and development of wheel control and locomotion/navigation strategies/algorithms to resolve complexity tradeoffs related to the large number of independent degrees of freedom.

In one aspect, the present disclosure describes a robot that includes a first module including a first body, a second module including a second body, and a connection mechanism disposed to connect the first body with the second body; at least two legs connected to the first body, and at least two additional legs connected to the second body, each of the at least two legs and the at least two additional legs comprising: a linkage connected at one end to the first or second body, and a pipe engaging member connected at another end of the linkage; wherein each linkage is configured to operate between a stowed position, in which the pipe engaging member is disposed adjacent the first or second body, and an extended position, in which the linkage is adapted to cause the pipe engaging member to slide against an inner surface of a pipe.

In one embodiment, when the first and second body are disposed within the inner surface of the pipe, the at least two legs and the at least two additional legs are extended by a same extent such that the first and second modules are generally disposed concentrically within the inner surface of the pipe.

As described herein, the connection mechanism is a differential joint that is configured to connect the first and second bodies for steering, but other configurations can also be used.

For traversing the inner surface of the pipe, each of the pipe engaging members can be a wheel that includes an integrated motor for autonomous and independent rolling motion along the inner surface of the pipe, the motor controlled by a robot controller associated with the first and/or second body. The at least two pipe engaging members can be adapted to engage the inner surface of the pipe at diametrically opposite locations.

In one embodiment, the robot further includes at least two more legs connected to the first body and at least two more additional legs connected to the second body, the legs being spaced symmetrically apart in pair around the respective first and second body.

Each linkage can include a plurality of linkage segments pivotally connected to one another at their ends such that a first linkage is connected to the respective first or second body and the last linkage is connected to the pipe engaging member. In one embodiment, a spring element disposed at each joint between adjacent linkage segments, the spring element biasing two adjacent link segments such that the linkage is biased towards the extended position; a powered winch disposed in the respective first or second body; and a cable connected between the winch and an end of the last linkage; wherein the powered winch is configured to tension the cable and counter the biasing of the linkage towards the extended position to set the linkage to a desired position.

In another embodiment, each linkage includes segments, each of the segments being connected to one another by a pivot joint, each pivot joint containing a spring integrated with a pulley, wherein a cable wraps over consecutive pulleys from an anchor point along a preceding linkage A to an anchor point B on a following linkage after wrapping around the two consecutive pulleys.

As contemplated herein, each of the first and second bodies has a length, L, and a width, w, and wherein the inner surface of the pipe is circular and is selected to have a minimum diameter that is equal to about $(L/2+w)(\sin 45°)$.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A robot, comprising:
    a first module including a first body,
    a second module including a second body, and
    a jointed connection mechanism disposed to jointly connect the first body with the second body configured for steering;
    at least two legs connected to the first body, and at least two additional legs connected to the second body, each of the at least two legs and the at least two additional legs are independently driven and comprise:
    a linkage connected at one end to the first or second body, and
    a pipe engaging member connected at another end of the linkage;
    wherein each linkage includes a plurality of linkage segments pivotally connected to one another by a pivot joint at their ends, including a first linkage segment pivotally connected to a respective first or second body and a last linkage segment connected to the pipe engaging member, and is configured to operate between a stowed position, in which the pipe engaging member is disposed adjacent to the first or second body, and an extended position, in which the linkage is adapted to cause the pipe engaging member to contact an inner surface of a pipe; and
    a spring element disposed at each joint between adjacent linkage segments, the spring element biasing two adjacent link segments such that the linkage is biased towards the extended position;
    a powered winch disposed in the respective first or second body; and
    a cable connected between the winch and an end of the last linkage;
    wherein the powered winch is configured to tension the cable and counter the biasing of the linkage towards the extended position to set the linkage to a desired position.

2. The robot of claim 1, wherein when the first and second bodies are disposed within the inner surface of the pipe, the at least two legs and the at least two additional legs are extended by a same extent such that the first and second modules are generally disposed concentrically within the inner surface of the pipe.

3. The robot of claim 1, wherein the jointed connection mechanism is a differential joint.

4. The robot of claim 1, wherein at least one of the pipe engaging members is a wheel that includes an integrated motor for autonomous and independent rolling motion along the inner surface of the pipe, the motor controlled by a robot controller associated with the first and/or second body.

5. The robot of claim 1, wherein the at least two pipe engaging members are adapted to engage the inner surface of the pipe at diametrically opposite locations.

6. The robot of claim 1, further comprising at least two more legs connected to the first body and at least two more additional legs connected to the second body, the legs being spaced symmetrically apart in pairs around the respective first and second bodies.

7. The robot of claim 1, wherein each pivot joint contains the spring integrated with a pulley, wherein the cable wraps over consecutive pulleys from an anchor point along a preceding linkage segment A to an anchor point B on a following linkage segment after wrapping around the two consecutive pulleys.

8. The robot of claim 1, wherein each of the first and second bodies has a length, L, and a width, w, and wherein the inner surface of the pipe is circular and is selected to have a minimum diameter that is equal to about $(L/2+w)(\sin 45°)$.

9. A method for inspecting an inner surface of a pipe using a robot, the method comprising:
providing a robot having at least a first module including a first body and a second module including a second body, the first and second bodies being connected by a jointed connection mechanism disposed to jointly connect the first body with the second body configured for steering;
providing at least two legs connected to the first body, and at least two additional legs connected to the second body, each of the at least two legs and the at least two additional legs are independently driven and comprise:
a linkage connected at one end to the first or second body,
a pipe engaging member connected at another end of the linkage;
a plurality of linkage segments pivotally connected to one another by a pivot joint at their ends, including a first linkage segment pivotally connected to a respective first or second body and a last linkage segment connected to the pipe engaging member;
providing a spring element disposed at each joint between adjacent linkage segments, the spring element biasing two adjacent link segments such that the linkage is biased towards the extended position;
connecting a cable between each of the first and second powered winches and an end of the last linkage segment;
wherein each of the first and second powered winches is configured to tension the cable and counter the biasing of the linkage towards the extended position to set the linkage to a desired position.

10. The method of claim 9, wherein when the first and second bodies are disposed within the inner surface of the pipe, the at least two legs and the at least two additional legs are extended by a same extent such that the first and second modules are generally disposed concentrically within the inner surface of the pipe.

11. The method of claim 9, wherein the jointed connection mechanism is a differential joint.

12. The method of claim 9, wherein at least one of the pipe engaging members is a wheel that includes an integrated motor for autonomous and independent rolling motion along the inner surface of the pipe, the motor controlled by a robot controller associated with the first and/or second body.

13. The method of claim 9, wherein the at least two pipe engaging members are adapted to engage the inner surface of the pipe at diametrically opposite locations.

14. The method of claim 9, further comprising providing at least two more legs connected to the first body and at least two more additional legs connected to the second body, the legs being spaced symmetrically apart in pairs around the respective first and second bodies.

15. The method of claim 9, wherein each pivot joint containing the spring integrated with a pulley, wherein the cable wraps over consecutive pulleys from an anchor point along a preceding linkage segment A to an anchor point B on a following linkage segment after wrapping around the two consecutive pulleys.

16. The method of claim 9, wherein each of the first and second bodies has a length, L, and a width, w, and wherein the inner surface of the pipe is circular and is selected to have a minimum diameter that is equal to about $(L/2+w)(\sin 45°)$.

17. A robot, comprising:
a first module including a first body,
a second module including a second body, and
a jointed connection mechanism disposed to jointly connect the first body with the second body configure for steering;
at least two legs connected to the first body, and at least two additional legs connected to the second body, each of the at least two legs and the at least two additional legs comprising:
a linkage connected at one end to the first or second body, and
a pipe engaging member connected at another end of the linkage;
wherein each linkage includes a plurality of linkage segments and each of the linkage segments being connected to one another by a pivot joint such that each linkage is configured to operate between a stowed position, in which the pipe engaging member is disposed adjacent the first or second body, and an extended position, in which the linkage is adapted to cause the pipe engaging member to slide against an inner surface of a pipe; and
each pivot joint contains a spring integrated with a pulley, wherein a cable wraps over consecutive pulleys from an anchor point along a preceding linkage segment A to an anchor point B on a following linkage segment after wrapping around the two consecutive pulleys.

\* \* \* \* \*